Dec. 28, 1937.   R. H. GORDON   2,103,901
CONVEYER MECHANISM
Filed Feb. 14, 1935   4 Sheets-Sheet 1

INVENTOR
Robert H. Gordon.
BY
Harness, Dickey, Pierce & Hann
ATTORNEYS.

Dec. 28, 1937.  R. H. GORDON  2,103,901
CONVEYER MECHANISM
Filed Feb. 14, 1935    4 Sheets-Sheet 2

INVENTOR
Robert H. Gordon.
BY
Harness, Dickey, Pierce & Hanna
ATTORNEYS.

Patented Dec. 28, 1937

2,103,901

UNITED STATES PATENT OFFICE 2,103,901

CONVEYER MECHANISM

Robert H. Gordon, Detroit, Mich., assignor to Parker Rust Proof Company, a corporation of Michigan Application February 14, 1935, Serial No. 6,417

14 Claims. (Cl. 198—20)

This invention relates to conveying mechanism and particularly to that type thereof in which articles to be transported and treated or worked upon are adapted to travel at different speeds during different phases of movement thereof, the principal object being the provision of a simple, economical and efficient mechanism of this type.

Although the mechanism provided by the present invention is applicable for use wherever it is desired to transfer and/or treat in any manner any type of articles, for the purpose of simplicity only reference hereafter will be made to its application to a rust proofing treatment only for articles such as parts of automobiles, its application for other uses such as plating, painting or the like, and for other types of articles, and the modification of the illustrative embodiment shown to adapt it to such other uses and/or articles, will be apparent to those skilled in the art upon the disclosure herein.

The invention pertains to the provision of means particularly applicable for conveying articles to be rustproofed through the various stages of a rustproofing process.

In systems of this character, as well as in other conveying systems, it is frequently advantageous to employ mono-rail or single track conveyer sections for conveying article holders lengthwise through those portions of the system which are not congested and where the articles travel comparatively long distances without being worked upon so as to lessen the quantity of structural materials required for the construction of the system. Single file and endwise movement of the article holder also permits free access to substantially all portions of the article thereof for washing, rinsing and other purposes. In other portions of the system, particularly where the rustproofing treatment is applied, multiple file, sidewise movement of the article holder on a double rail or double track conveyer section facilitates the simultaneous treatment of a large number of articles in a relatively short rustproofing tank which has only a small surface of rustproofing solution exposed to evaporation by atmosphere.

One of the main objects of the invention is to provide a completely automatic conveying system of this character which has diverse portions thereof constructed and arranged and driven in a predetermined timed relation to move the articles in that manner, and at that speed which is best suited for each particular stage of a rustproofing process respectively.

Another object of the invention is to provide improved transfer mechanism, in a conveying system of this character, for automatically transferring loaded article holders, or other articles, from a mono-rail or single track conveyer section to a double rail or double track section thereof, and for thereafter returning the article holders to the mono-rail section.

A further object of the invention is to provide transfer mechanism of this kind which is adapted to cause an abrupt, substantially 90 degree change in the direction of movement of comparatively long article holders so as to accommodate the movement thereof throughout a predetermined, substantially endless circuit with the provision of relatively little clearance space at certain of the locations at which the direction of movement of the article holders is changed.

A still further object of the invention is to provide transfer mechanism of this character which occupies only a relatively small amount of floor space and which requires only a comparatively short path through which to move the article holders from one rail section to another.

An additional object of the invention is to provide transfer mechanism of this kind which is particularly adapted to facilitate the close coupling of the mono and double rail sections of the conveying system.

Other objects of the invention are to provide improved means in the article holder transfer apparatus for automatically centering the article holders with respect to the rails of the double track section as they are moved thereto from the mono-rail section; to provide mechanism of this character which effects a rapid transfer of the article holders from one rail section to another without excessively vibrating, jarring or otherwise displacing the articles thereon; to provide for movement of the article holders from the mono-rail section to the double rail section in the general direction in which they are normally moved along the latter rail section; to provide improved driving apparatus for the transfer mechanism which is normally releasably held against operation and adapted to promptly start and complete a transverse cycle when released; and to provide means responsive to the presentment of an article holder at a predetermined location relative to one rail section for automatically releasing and energizing the driving means so as to render the latter operative.

Further objects of the invention are to provide improved article holders that are particularly adapted for supporting articles on a conveying system of this kind; to provide article holders which have separate portions for the reception of articles and for connection with the conveying system respectively so as to guard against movement of the articles by engagement with the parts of the conveying system during transfer from one rail section thereof to another and during progress of the article holders throughout the course defined by the conveying apparatus; to provide improved carriages on the conveying system which have hooks for detachably engaging the article holders; and to provide restricted purchases on the article holders for the reception of the foregoing hooks, one of said purchases being sufficiently restricted to hold the movement of the article holders relative to that hook within close limits and the other purchase being constructed to permit sufficient movement of the article holder relative to the hooks to accommodate travel of the article holder around a curved course.

The above being among the objects of the present invention, the same consists in certain novel features of construction and combinations of parts to be hereinafter described with reference to the accompanying drawings and then claimed, having the above and other objects in view.

An illustrative embodiment of the invention is shown in the accompanying drawings, in which.

Figure 1:
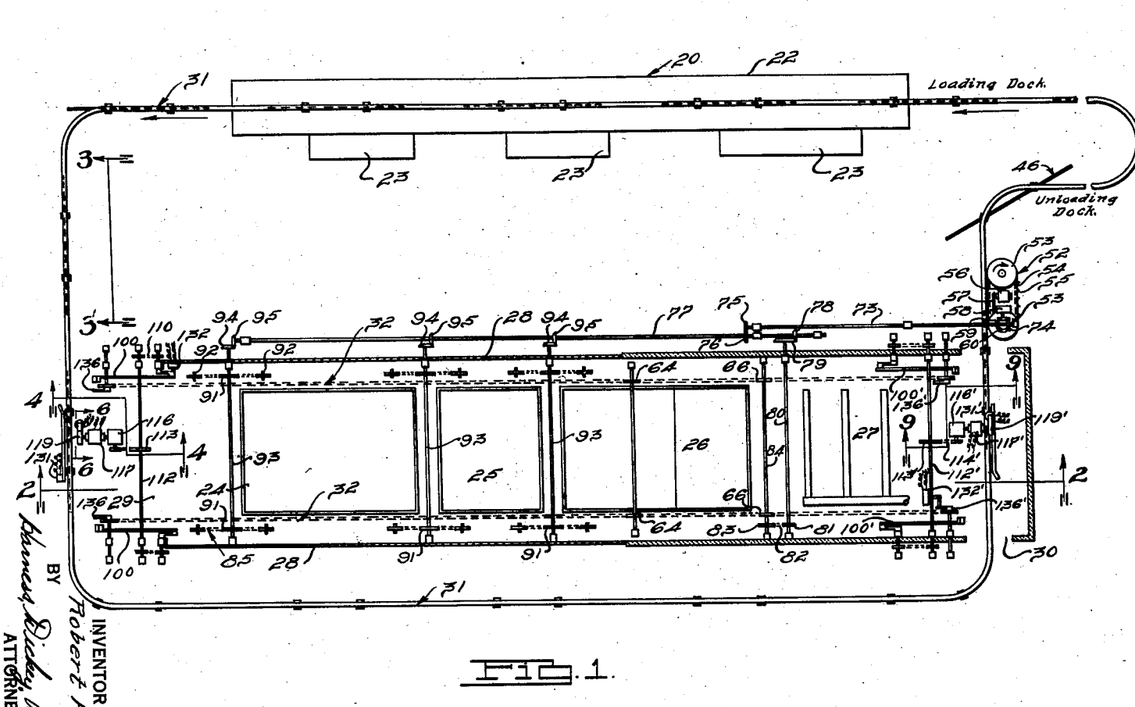
Figure 1 is a diagrammatic illustrational plan view of a system for conveying articles through the various stages of a rustproofing process.

In Fig. 1 of the drawings is illustrated an embodiment of the improved conveying system in rust proofing apparatus which generally includes a washing station 20 at which articles to be rust proofed are subjected to an initial washing operation either by manual or by mechanical application thereto of water, or other suitable cleaning agents. The washing station 20 preferably includes a housing or station, diagrammatically illustrated at 22, in which suitable spray devices (not shown) are provided for forcefully applying water sprays on the articles. There are also diverse tanks 23 arranged longitudinally of the casing 22 for accommodating cleaning and rinsing solutions for use upon the articles passing through the casing 22. The next successive portion of the rust proofing apparatus includes a rust proofing unit, best shown in Fig. 2, which comprises a rust proofing solution tank 24, a cold water rinsing tank 25, and a chromic acid solution tank 26, arranged in adjacent, aligned relationship with a drying chamber 27. The tanks 24, 25 and 26 may contain any suitable solutions required for the particular rust proofing process to which the articles are to be subjected. The tanks 24, 25 and 26 and the drying chamber 27 are preferably enclosed within a casing or housing 28 having an inlet opening 29 at its left end and an outlet opening 30 at the right end of the unit, as viewed in Figs. 1 and 2. Loading and unloading docks, represented in the drawings by corresponding legends, are also provided, at which articles to be treated may be loaded upon the improved conveying mechanism and removed therefrom after the rust proofing operation, respectively.

The conveying apparatus includes a system of rails having related mono-rail and double rail sections, generally designated by the numerals 31 and 32, respectively. The mono-rail section 31 circumscribes the double rail section 32 and extends through the loading dock, washing station 20 and unloading dock in the order recited, as illustrated in Fig. 1. The double rail section 32 extends lengthwise of the course of the mono-rail section 31 and serves in effect, to by-pass articles from one end to the other end of the mono-rail section. It should be understood that the rails of the double rail section 32 are substantially perpendicular to the ends of the course defined by the mono-rail section 31 and that, although the conveyer of the mono-rail section 31 extends in an endless course, that portion thereof which is illustrated as being below the rustproofing unit in Fig. 1, does not carry the article holder, but merely serves to complete the circuit of the article holder carriers of the mono-rail section.

Figure 3:
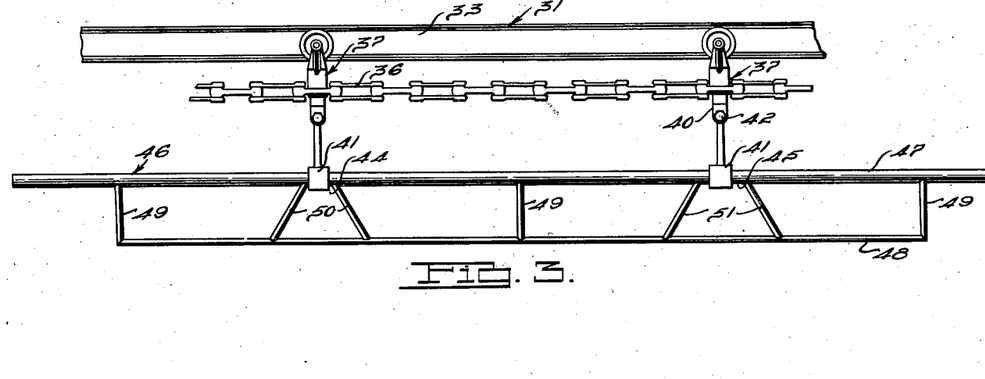
Fig. 3 is a fragmenary, side elevational view illustrating the mono-rail section of the conveying system as viewed from the line 3—3 of Fig. 1 and showing an article holder by which a plurality of articles may be supported and moved in a unitary fashion.
Figure 7:
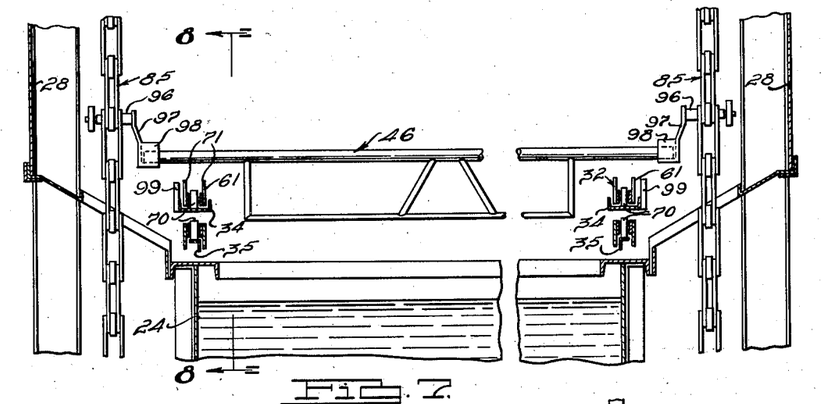
Fig. 7 is an enlarged, fragmentary, transverse vertical sectional view taken on the line 7—7 of Fig. 2.

The mono-rail section includes a continuous rail 33 of I-shaped cross section, illustrated in Fig. 3, and the double rail section includes a pair of channel shaped rails 34 arranged in spaced relationship, as illustrated in Fig. 7, each of which is associated with a lower rail 35 comprising an angle bar. These rails are supported by suitable frame structure (not shown) which is so constructed and arranged as not to obstruct the free passage of articles and article holders throughout the courses defined by the various conveyer sections.

Figure 4:
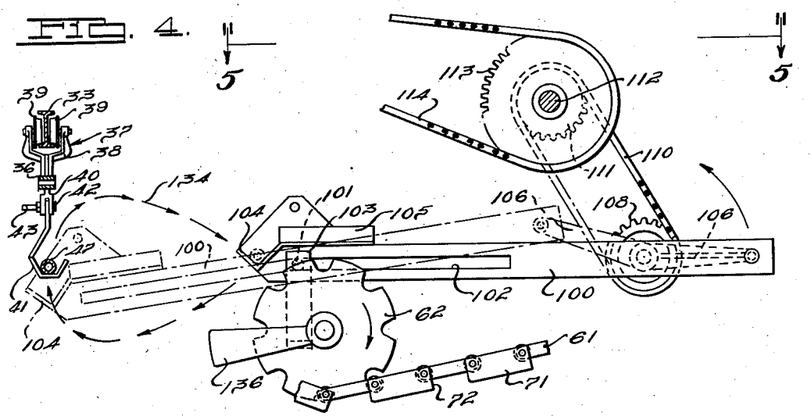
Fig. 4 is an enlarged, fragmentary, longitudinal sectional view of the transfer mechanism taken on line 4—4 of Fig. 1.

Movably mounted on the rail 33 of the mono-rail section 31 is an endless conveyer chain 36 which is supported in suspended relation by spaced carriages, generally designated by the numeral 37, which, as illustrated in Fig. 4, include a yoke-shaped body portion 38 having arms on opposite sides of the rail 33 on which are journaled rollers 39, each roller being engaged between the flanges of opposite sides of the rail 35 respectively, and having rolling contact engagement with one side portion of the lowermost flange of the rail 33 respectively. Each carriage 37 is permanently fixed to one of the links of the chain 36 and is provided with a coupling element 40 extending below the chain 36 to which a hook 41 is attached at 42. The leading carriage 37 of each pair of adjacent carriages is provided with an outwardly extending arm 43 for operating a switch of control apparatus, hereinafter described.

The hooks of each pair of adjacent carriages 37 are receivable in restricted purchases 44 and 45 provided on elongated article holder, generally designated by the numeral 46 in Fig. 3, each of which include a supporting rod 47 and a substantially parallel article supporting member 48.

The supporting rod 47 and the article supporting member 48 are rigidly connected together by spaced bars 49 extending substantially perpendicular to the supporting rod 47 and pairs of inclined transverse bars 50 and 51 which restrict the purchases 44 and 45 and between which the hooks 41 of the carriages 37 are receivable. The inclined bars 50 have upper end portions connected with the supporting rod 47 which are spaced apart a distance only slightly greater than the width of one hook of each pair of hooks 41 so as to confine the movement of the article holder 46 relative to one carriage of each of the pairs of carriages with relatively close limits. The inclined bars 51 have upper end portions connected with the supporting rods 47 which are spaced apart a distance substantially greater than the width of the other hook 41 of each pair of carriages in order to accommodate sufficient movement of the article holder 46 relative to the other carriage of each pair of carriages to permit movement of the article holder in a curved course at certain portions of the mono-rail section 31.

The conveyer chain 36 is continuously driven in a counter-clockwise direction as viewed in Fig. 1, by a caterpillar driving device, generally designated by the numeral 52 which includes a pair of spaced sprocket wheels 53 around which a chain 54 is disposed. The chain 54 has outwardly extending projections 55 which register with and fit into the spaces between adjacent pivots of the links of the chain 36 to establish a driving connection therewith. One of the sprocket wheels 53 is driven by a variable speed motor 56 which is operatively connected by a chain 57 with a speed reducing transmission 58. The transmission 58 includes a shaft on which a bevel gear 59 is fixed and the bevel gear is meshed with a bevel gear 60 which is in turn positively connected with one of the sprocket wheels 53 of the caterpillar driving device 52.

The main portion of the double rail conveyer section 32 is confined within the housing 28 of the rustproofing unit and it includes a pair of endless conveyer chains, each generally designated by the numeral 61, which extend around a sprocket wheels 62 and 63 at the left and right ends of the rustproofing unit respectively. The upper side of the loop formed by each conveyer chain 61 has a left end portion which is held in a substantially horizontal position between the sprocket wheel 62 and an intermediate sprocket wheel 64. That portion of the upper side of the loop formed by each conveyer chain 61 which extends rightwardly from the sprocket wheel 64 is inclined upwardly over a sprocket wheel 65 located substantially directly above the junction of the tank 26 and the drying chamber 27, and the extreme right end portion of the upper side of the loop formed by each conveyer chain 61 is inclined downwardly from the sprocket wheel 65 to the sprocket wheel 63. The lower or return side of each loop formed by each conveyer chain 61 passes around a driving sprocket wheel 66 and around an adjacent adjustable idler sprocket wheel 67, by which the chain may be tensioned, and then extends around a related sprocket wheel 68 from which each chain is inclined upwardly to a location slightly above the upper elevation of the tank 26, and passes around a sprocket wheel 69. The remaining portion of the return side of each loop formed by each conveyer chain 61 then extends substantially horizontally over the tanks 24, 25 and 26 to the extreme left hand sprocket wheel 62, as illustrated in Fig. 2.

Those portions of the upper and lower sides of each loop formed by each conveyer chain 61 are supported, as illustrated in Fig. 7, by the rails 34 and angle bars 35, the links of the conveyer chain 61 being provided with rollers 70 by which they are suitably supported upon the tracks 34 and angle bars 35. Alternate links of the conveyer chain 61 are connected together by upstanding plates 71 disposed on respectively opposite sides thereof, between which recesses 72 are formed for the reception of the end portions of the article holders.

The conveyer chains 61 of the double rail conveyer sections are driven in timed relation to and preferably at a slower rate than the chain 36 of the mono-rail conveyer section, by a shaft 73 having a bevel gear 74 thereon meshed with the bevel gear 60 of the caterpillar driving mechanism 52. The shaft 73 has a spur gear 75 on its left end which is meshed with a spur gear 76 mounted on a longitudinally extending shaft 77 which extends substantially the entire length of the rustproofing unit. The shaft 77 is substantially parallel to the shaft 73 and has a right end portion overlapping the latter shaft which is provided with a bevel gear 78 that is meshed with a bevel gear 79 mounted on a shaft 80 extending transversely of the double rail section 32. The shaft 80 has a sprocket 81 fixed thereon which is operatively connected by a chain 82 with a sprocket wheel 83 fixed on a shaft 84 by which driving sprocket wheels 66 of the double rail conveyer chains 61 are carried.

Figure 2:
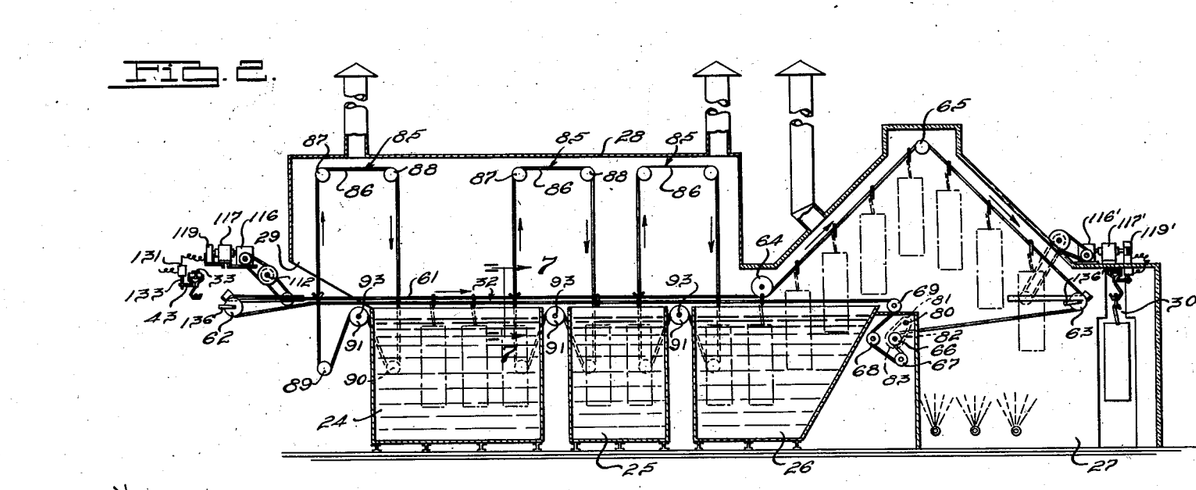
Fig. 2 is a fragmentary, vertical, sectional view taken on the line 2—2 of Fig. 1.

Three elevating and lowering units, generally designated in Fig. 2 by the numeral 85, are provided for lifting the articles over the extremities of the tanks 24, 25 and 26 and lowering such articles into the latter. One of these elevating and lowering units is provided adjacent the left extremity of the tank 24, another is arranged at the adjacent extremities of the tank 24 and the tank 25 and the third is located at the adjacent extremities of the tank 25 and the tank 26. The inclined right end portions of the double rail section 32 is relied upon to lift the articles over the right extremity of the tank 26 and to bring such articles into the drying chamber 27. The article raising and lowering units 85 are substantially identical and therefore, a description of one unit will serve for all. Each unit 85 includes a pair of endless conveyer chains 86 which travel in a looped course defined by rectangularly spaced idler sprocket wheels 87, 88, 89 and 90, respectively, and a driving sprocket wheel 91 which is located between the lower idler sprocket wheels 89 and 90 at an elevation above the latter, as illustrated in Fig. 2. The idler sprocket wheels are suitably rotatably mounted on stub shafts 92 and a driving sprocket wheel 91 for each conveyer chain 86 is fixed on a shaft 93 extending transversely of the double rail section, the conveyer chains 86 being disposed in substantially vertical planes on opposite sides of the side planes of the tanks 24, 25 and 26. The shaft 93 of each article raising and lowering unit 85, is provided on one end with a bevel gear 94, which is meshed with a bevel gear 95 fixed to the longitudinally extending shaft 77, the latter shaft being driven, as heretofore set forth, by the shaft 73 which is operatively connected with the transmission 58 of the caterpillar driving device 52. The speed of the elevating and lowering units 85 may be predetermined by the size of the various gears of the driving mechanism and may be varied by changing the speed of the motor 56. In order to prevent drying of the various solutions of the tanks upon the articles during transfer thereof from one tank to another, the operating speed of the units 85 preferably exceeds that of the mono-rail and double rail conveyer sections.

Figures 8, 9:
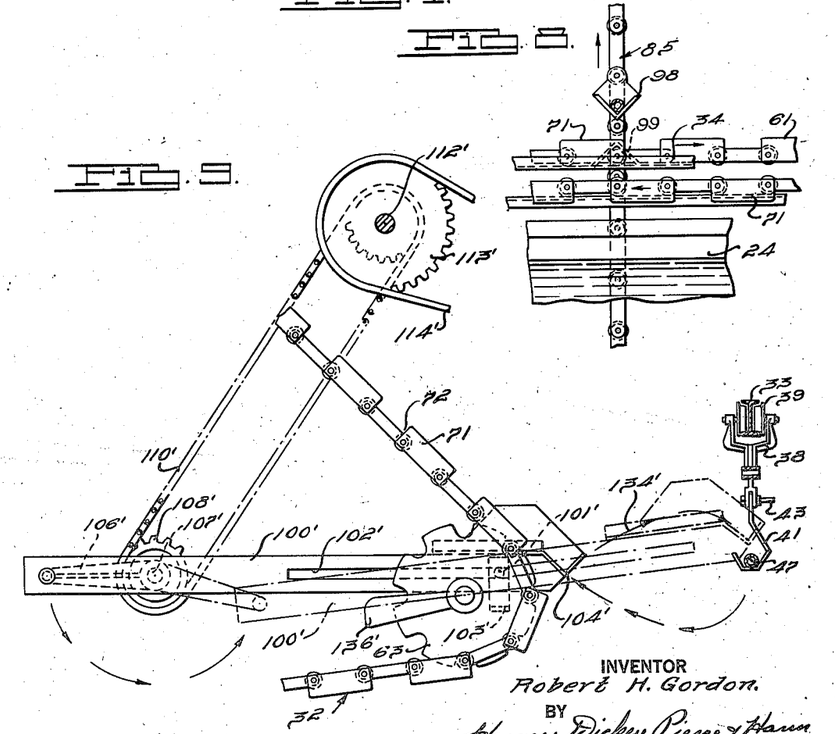
Fig. 8 is a fragmentary, vertical sectional view taken on the line 8—8 of Fig. 7.
Fig. 9 is an enlarged, fragmentary, longitudinal, vertical sectional view taken on the line 9—9 of Fig. 1.

Pivotally mounted on each conveyer chain 85 of the article elevating and lowering units are crank members 96, each having an inwardly extending arm 97, on the extremity of which is provided a V-shaped socket element 98 for receiving the end portions of the supporting rod 47 of the article holder 46. The conveyer chains 85 of the article elevating and lowering units travel in vertical planes substantially perpendicular to the planes in which the article holders are moved by the horizontal portion of the conveyer chains 61 of the double rail section 32, and these conveyer chains are driven in a suitable timed relation to facilitate the removal of the article holders from the conveyer chains 61 as the latter bring the article holders into the path of movement of the socket element 98, in the manner illustrated in Fig. 8. The article holders 46, and the articles thereon, are removed from the conveyer chains 61 of the double rail conveyer section when they are moved thereby into registration with the left side of the first elevating and lowering units 85. The article holders, together with the articles thereon, are moved upwardly and translated to the right, as viewed in Fig. 2, sufficiently to bring the articles into registration with the end portion of the tank 24 and then they are moved downwardly in the path defined by the right side of the loop formed by the conveyer chain 85 and deposited upon the conveyer chains 61 by which they are moved further to the right until they register with the right side of the next adjacent elevating and lowering unit 85, by which the foregoing operating cycle is repeated in transferring the articles from one tank to the next adjacent tank. This same operation occurs in the transfer of the articles from the tank 24 to the tank 25 and from the latter to the tank 26.

In order to prevent an article holder from being carried past the upwardly moving side of either of the elevating and lowering units 85, an inverted V-shaped ramp 99 is provided on the track 34 adjacent each upwardly moving side of each elevating and lowering unit. The ramp 99 prevents the passage of any article holder which has not been picked up by the article receiving socket elements 98 of the conveyer chains 86 and raises the article holder upwardly sufficiently to engage it upon the upper edge portions of the plates 71 of the links of the conveyer chains 61. In this way, movement of an article holder, which has not been picked up by the socket elements 98 of the elevating and lowering units 85, rightwardly beyond the upwardly moving sides of the conveyer chains of such units is prevented, and such article holders are held in registration with the upwardly moving sides of the conveyer chains 85 until one of the next succeeding pairs of socket elements 98 remove the article holder from the conveyer chain 61 of the double rail section 32.

The transfer mechanism illustrated in Fig. 4 is provided for transferring the article holders, and the articles thereon, from the mono-rail section to the receiving end of the double rail section 32 at the left end of Fig. 2. This apparatus includes a pair of spaced arms 100 which are pivotally and slidably mounted intermediate their ends upon pins 101 respectively which extend through a longitudinal slot 102 formed in each of the arms 100, respectively. The pins 101 are carried by suitable brackets 103 mounted on the frame structure of the transfer apparatus and each arm 100 is located on the outer side of one of the rails of the double rail section 32 respectively. Mounted on the outer end of each transfer arm 100 is a trough-shaped receiver 104 in which one end portion of the rod 47 of the article holder 46 is receivable. Provided adjacent each trough-shaped receiver 104 is a vertically upstanding plate 105 which extends diagonally with respect to the direction of movement of the article holder by the transfer apparatus and which is adapted to center the article holder with respect to the rails of the double rail section 32.

The right end portion of each transfer arm 100 is pivotally attached to a crank arm 106 carried by a relatively short shaft 107 on which a sprocket wheel 108 is fixed. The shaft 107 is journaled in suitable bearings 109 and the sprocket wheel 108 thereof is operatively connected, by a chain 110, with a sprocket wheel 111 fixed to a shaft 112 which extends transversely of the double rail section 32 and on the intermediate portion of which is fixed a sprocket wheel 113. The sprocket wheel 113 is operatively connected by a sprocket chain 114 with a speed reducing transmission 116 which is so connected as to be driven by an electric motor, or other prime mover 117.

Figures 5, 6:
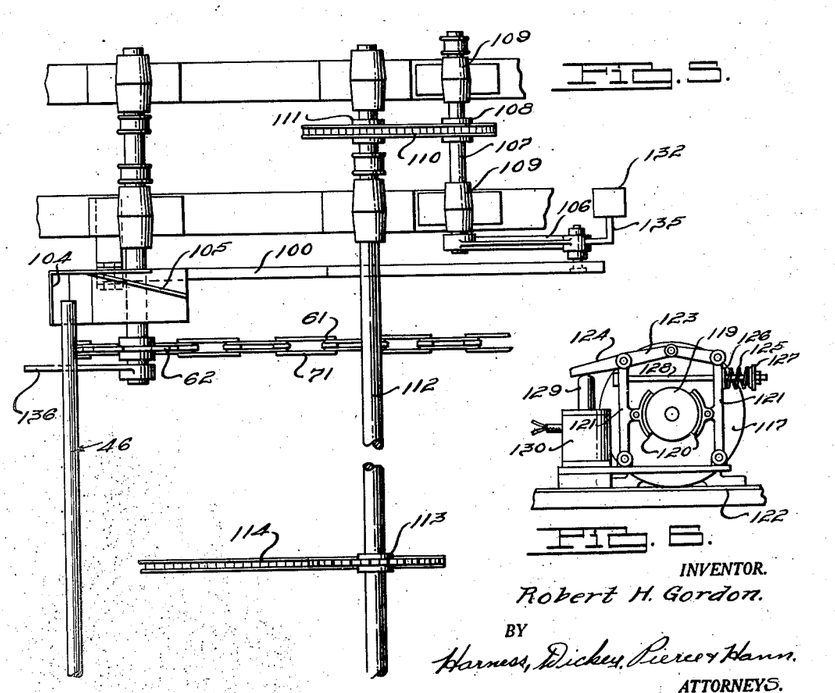
Fig. 5 is a fragmentary, horizontal sectional view taken on the line 5—5 of Fig. 4.
Fig. 6 is an enlarged, fragmentary, transverse vertical sectional view taken on the line 6—6 of Fig. 1.

The transmission mechanism 116 is operatively connected with one end of the shaft of the motor 117 and the other end of such shaft is provided with a brake drum 119 with which brake shoes 120 are associated, as illustrated in Fig. 6. The brake shoes 120 are pivotally supported by vertically upstanding levers 121, each of which is pivotally mounted at its lower end to a base structure 122, or other suitable support. The upper ends of the vertically upstanding levers 121 are pivotally connected together by toggle mechanism 123, one arm of which has an outwardly projecting extension 124, which serves as a brake operating lever. The upright levers 121 and the brake shoes 120 carried thereby are resiliently urged together by a coil spring 125 which bears between a plate 126 on the right hand lever 121 and a plate 127 fixed to the end of a cross rod 128 which is slidably mounted in an aperture formed in the plate 126 and secured to the left hand lever 121, as illustrated in Fig. 6. The spring 125 normally yieldably holds the brake shoes 120 in an applied condition and the brake shoes are adapted to be released by the action of a plunger 129 of a solenoid 130, the plunger 129 bearing upwardly upon the operating lever 124 so as to rotate the latter in a clockwise direction, as viewed in Fig. 6, when the solenoid is excited. The motor 117 and the solenoid 130 are electrically connected in a suitable circuit with starting and stopping switches 131 and 132 respectively, shown in Fig. 1.

The motor starting and solenoid energizing switch 131 is provided with a control arm 133 which is located adjacent the mono-rail section 31 and so constructed and arranged as to be operable by engagement with the pin 43 of the leading carriages 37 by which the article holder is supported. Contact between the switch control arm 133 and the pin 43 occurs when the article holder is in registration with the receiving, or left end of the double rail section 32, as viewed in Fig. 1, and closing of this switch resulting from such contact, causes the brake mechanism to be released and the motor 117 to be energized. The motor 117 drives the outer end of each transfer arm 100 through the course illustrated by the arrows 134 in Fig. 4, causing the trough-shaped receiver 104 to follow a looped course, a portion of which intersects the path of movement of the article holders on the mono-rail section 31 in an upwardly moving direction. When the arm 100 is returned to its normal full line position, as shown in Fig. 4, the outer end of one of the crank arms 106 engages a control lever 135 of the motor stopping and solenoid de-energizing switch 132, as illustrated in Fig. 5. This action applies the brakes 120 and stops the motor 117, thereby retaining the article holder in the full line position illustrated in Fig. 4. The switches 131 and 132 are of the double throw type and they are so electrically connected together that, as the switch 132 is operated to open the circuit of the motor 117 and solenoid 130, the switch 131 is conditioned to close this circuit when the arm 133 thereof is engaged by the pin 43 of the leading carriage of the next pair of carriages 37, thereby conditioning the switch mechanism for another complete operating cycle. The switch 132 is preferably arranged to be operated by one of the crank arms 106 of the transfer driving mechanism, but this switch may be arranged to be responsive to movement of any selected part of such driving mechanism.

The article holder remains at rest upon the trough-shaped receiving element 104 in the position illustrated in full lines in Fig. 4, until an arm 136 carried by the sprocket wheel 62 and rotated thereby in a clockwise direction, as viewed in Fig. 4, displaced the article holder from the receiving elements 104 and deposits the same upon the main conveyer chains 61 of the double rail section 32. The chains 61 of the double rail section 32 then move the article to the right, as viewed in Fig. 2, until the article holders and articles thereon are raised and lowered in the foregoing manner by the first elevating unit 85.

The article holders 46 are removed from the right end of the double rail section 32 and deposited upon the chain of the mono-rail section 31 by transfer apparatus which is substantially identical in construction to, but which operates in a reverse manner from, that shown in Figs. 4 and 5 and described above. The transfer apparatus which is at the discharge end of the double rail section 31 includes a pair of longitudinally extending transfer arms 100', each of which is slidably and pivotally mounted immediate its ends upon a pin 101' carried by a bracket 103'. Each pin 101' extends through a longitudinally extending slot 102' formed in a transfer bar 100'. The inner end of each transfer bar is pivotally attached to a crank arm 106' carried by a relatively short shaft 107' on which a sprocket wheel 108' is fixed. The sprocket wheels 108' are each operatively connected by a sprocket chain 110' with a sprocket wheel 111', respectively, mounted on a shaft 112' which extends transversely of the double rail conveyer section. The shaft 112' is provided with a driving sprocket wheel 113' which is operatively connected by a sprocket chain 114' with a speed reducing transmission 116' that is driven by an electric motor, or other prime mover 117', illustrated in Fig. 1. The outer end of the shaft of the motor 117' is provided with a brake drum 119' with which is associated brake apparatus identical to that shown in Fig. 6.

The electric motor 117' and the solenoid of the brake mechanism associated therewith are electrically connected in a circuit with starting and stopping switches 131' and 132' respectively. The switch 131' is operable by the pin 43 of the leading carriage of a pair of carriages when the latter are in position to receive an article holder from the trough shaped receiving element 104' provided on the outer ends of the transfer arms 100'. The article holder is removed from the discharge ends of the conveying chains 61 and deposited in the receiving elements 104' by arms 136', one carried by each sprocket wheel 63 of the opposite sides of the double rail conveyer section 32, respectively, and when the starting switch 131' is closed in the foregoing manner, the driving mechanism of the transfer apparatus moves each receiving element 104' through the loop shaped course illustrated by the arrows 134' in Fig. 9, a portion of which intersects the path of movement of the carriages 37 of the mono-rail section 31 in a downwardly extending direction. The article holders are deposited upon the hooks 41 of the carriages 37 and the discharging transfer apparatus is returned to its normal full line position shown in Fig. 9. When the transfer arms 100' reach their normal position, the switch 132' is actuated by the end of one of the crank arms 106' to open the circuit of the motor 117' and the solenoid of the brake mechanism. This operation causes the transfer arms 101' to be held at rest and also reconditions the switch circuit so that the starting switch 131' will commence the foregoing cycle when it is actuated by engagement of the pin 43 of one of the carriages of the next successive pair of carriages.

The mono-rail section then conveys the article holders and articles thereon to the unloading dock, indicated at the right end of Fig. 1, at which the articles are removed from the article holder by attendants. The article holder then continues to travel throughout the course defined by the mono-rail section 31 to the loading dock where they are again loaded.

The foregoing transfer apparatus requires relatively little floor space for its accommodation, and, since, at the left end of the double rail section, it moves the articles in a direction substantially perpendicular to their prior course of movement and, at the left end section, it moves the articles in a direction substantially perpendicular to their future course of movement, no clearance spaces are required to accommodate turning of the article holders throughout a curved course and it is therefore possible to employ article holders of relatively great length. All phases of the operation of the transfer apparatus are completely automatic and under the control of mechanism that is responsive to movement of the articles throughout respective portions of their courses of travel. No manual attention whatsoever is required and, due to the construction of the article holders and the various parts of the transfer apparatus by which they are engaged during manipulation thereof, all chance of contact of the articles with portions of the transfer apparatus is positively eliminated. The movement of the article holders in the looped courses defined by the arrows 134 and 134' prevents sudden and jerky reversal of direction of movement thereof and, consequently, eliminates displacement of the articles relative to each other and to the article holder, during the transfer operation.

It should be understood that while only one article holder has been mainly referred to, in practice a plurality of article holders is moved in succession throughout the courses defined.

Although but one specific embodiment of the invention has been illustrated and described in detail, it will be apparent to those skilled in the art that various modifications may be made without departing from the scope of the appended claims.

I claim:

1. Conveying apparatus including a system of rails having adjacent mono-rail and double rail sections provided with angularly disposed transfer portions, said transfer portions of said rail sections each being substantially horizontally disposed, means for movably supporting articles associated with each rail section, respectively, separable holders movable by said means, and apparatus for automatically transferring said article holders from one of said adjacent transfer portions of said rail sections to the other including a carrier constructed and arranged to move said article holders bodily in the general direction of movement thereof on one of the transfer portions of said rail sections.

2. Conveying apparatus including a system of rails having adjacent mono-rail and double rail sections provided with angularly disposed transfer portions, said transfer portions of said rail sections each being substantially horizontally disposed, means for movably supporting articles associated with each rail section, respectively, article holders movable by said means, apparatus for automatically transferring said article holders from one of said adjacent transfer portions of said rail sections to the other including a carrier constructed and arranged to move said article holders bodily in the general direction of movement thereof on one of the transfer portions of said rail sections, and control mechanism responsive to movement of said article holders on one of said rail sections for automatically moving said transfer apparatus into engagement with said article holder when said article holder is in registration with the transfer portion of the adjacent rail section.

3. In conveying apparatus comprising a pair of angularly disposed conveyer sections having adjacent transfer portions; apparatus for automatically transferring an article from one of said transfer portions to the other including a member for receiving said article, means for supporting and moving said article in a path intersecting the path of movement of said article on one of said conveyer sections, and a member operable by the other conveyer sections in timed relation therewith for shifting said article between the latter conveyer section and said transferring apparatus, the construction and arrangement being such that the member engages and raises said article from said transferring apparatus to engagement with said latter conveyer section.

4. In conveying apparatus comprising delivering and receiving conveyer sections, one of said conveyer sections being a single track section and the other being a double track section; apparatus for automatically transferring an article from said delivering conveyer section to said receiving conveyer section, including a member for receiving said article while the latter is supported on said delivering conveyer section, and means for supporting and moving said member in an endless cycle extending from said delivering conveyer section toward the other section and having a path extending upwardly at and intersecting the path of movement on said delivering conveyer section said delivering and receiving sections adjacent the point of transfer being substantially horizontally disposed.

5. In conveying apparatus comprising delivering and receiving conveyer sections; apparatus for automatically transferring an article from said delivering conveyer section to said receiving conveyer section, including a member for receiving said article while the latter is supported on said delivering conveyer section, means for supporting and moving said member in an endless cycle extending from said delivering conveyer section toward the other section and having a path extending upwardly at and intersecting the path of movement on said delivering conveyer section, rotatable means for removing said article from said member and depositing the same on said receiving conveyer section, and mechanism for driving said receiving conveyer and said last mentioned means in a predetermined timed relation.

6. In conveying apparatus comprising a pair of angularly disposed conveyer sections having adjacent transfer portions; apparatus for automatically transferring an article from one of said transfer portions to the other including a member for receiving said article, means for supporting and moving said article in a path intersecting the path of movement of said article on one of said conveyer sections, and a rotatably movable member operable by the other conveyer sections in timed relation therewith for shifting said article between the latter conveyer section and said transferring apparatus.

7. In conveying apparatus comprising a pair of angularly disposed conveyer sections having adjacent transfer portions, one of said conveyer sections being a single track section and the other being a double track section, apparatus for automatically transferring an article from one of said transfer portions to the other including a frame structure, a pair of arms pivotally and slidably mounted intermediate their ends on said frame structure, a member for receiving a portion of an article on the outer end of each arm respectively, and a crank having a crank arm pivotally attached to the opposite end of each arm respectively, and adapted to move said members through a substantially continuous cycle having a portion intersecting the path of movement of said article on one of said conveyer sections during each complete rotation of said crank.

8. In conveying apparatus comprising a pair of angularly disposed conveyer sections having adjacent transfer portions, apparatus for automatically transferring an article from one of said transfer portions to the other including a frame structure, a pair of arms pivotally and slidably mounted intermediate their ends on said frame structure, a member for receiving a portion of an article on the outer end of each arm respectively, a crank having a crank arm pivotally attached to the opposite end of each arm respectively, and adapted to move said members through a substantially continuous cycle having a portion intersecting the path of movement of said article on one of said conveyer sections during each complete rotation of said crank, and means rotatably operable by the other conveyer section in timed relation therewith for shifting said article between the latter conveyer section and said members.

9. In conveying apparatus comprising a pair of angularly disposed conveyer sections having adjacent transfer portions, apparatus for automatically transferring an article from one of said transfer portions to the other including a frame structure, a pair of arms pivotally and slidably mounted intermediate their ends on said frame structure, a member for receiving a portion of an article on the outer end of each arm respectively, a crank having a crank arm pivotally attached to the opposite end of each arm respectively, and adapted to move said members through a substantially continuous cycle having a portion intersecting the path of movement of said article on one of said conveyer sections during each complete rotation of said crank, means operable by the other conveyer section in timed relation therewith for shifting said article between the latter conveyer section and said members, means for rotating said crank, and means responsive to movement of said article into registration with said receiving members for automatically controlling the actuation of said crank independent of said receiving members.

10. In conveying apparatus comprising a single track conveyer section and a double track conveyer section angularly disposed with respect thereto, apparatus for automatically transferring an article holder from said single track conveyer section to said double track conveyer section including members for receiving opposite end portions of said article holders, means including inclined plates on said members for centering said article holder with respect to said double track conveyer section, and means for supporting and moving said members in a loop-shaped path extending upwardly at and intersecting the path of movement of said article holder on said single track conveyer section and extending toward said double track conveyer section.

11. In conveying apparatus comprising a pair of angularly disposed conveyer sections having adjacent transfer portions, apparatus for transferring an article from one of said transfer portions to the other including a member for receiving said article, means for supporting and moving said member in a looped-shaped path extending downwardly and intersecting the path of movement of said article on one of said conveyer sections and extending thereto from within close proximity of the other conveyer section, and means rotatably operable by the latter conveyer section for shifting said article therefrom to said member.

12. Apparatus for conveying articles throughout a predetermined course including an elongated support, means separable from said support for movably supporting said support and confining the movement thereof to a predetermined course including a system of rails having a mono-rail section forming one path and a double rail section forming another path, said rail sections having adjacent transfer portions extending substantially perpendicular to each other and being substantially horizontally disposed, and apparatus for transferring said article supports from one transfer portion of one rail section to the adjacent transfer portion of the other rail section including a carrier constructed and arranged to remove said article holder from one transfer portion and move said article holder in a direction substantially perpendicular to its direction of movement on one of said adjacent transfer portions of said rail sections.

13. In conveying apparatus comprising a single track conveyer section and a double track conveyer section angularly disposed with respect thereto, apparatus for automatically transferring an article holder from said single track conveyer section to said double track conveyer section including members for receiving opposite end portions of said article holders, means on said members for centering said article holders with respect to said double track conveyer section, and means for supporting and moving said members in a loop shaped path extending upwardly at and intersecting the path of movement of said article holder on said single track conveyer section and extending toward said double track conveyer section.

14. Apparatus for conveying articles through a predetermined course including an elongated support, means separable from said support for movably supporting said support and confining the movement thereof to a predetermined course including a system of rails having a mono-rail section forming a looped path and a double rail section forming another path within said looped path, said rail sections having adjacent transfer portions extending substantially perpendicular to each other and being substantially horizontally disposed, and apparatus for transferring said article supports from one transferred portion of one rail section to the adjacent transfer portion of the other rail section, including a carrier constructed and arranged to remove said article holder from one transfer portion and move said article holder in a direction substantially perpendicular to its direction of movement in one of said adjacent transfer portions of said rail sections.

ROBERT H. GORDON.